United States Patent [19]

Kirpichenkov

[11] 4,173,985
[45] Nov. 13, 1979

[54] STRAIGHTWAY VALVE

[76] Inventor: Alexandr G. Kirpichenkov, ulitsa Komsomola, 45, kv. 29, Leningrad, U.S.S.R.

[21] Appl. No.: 814,094

[22] Filed: Jul. 8, 1977

[51] Int. Cl.$^2$ ............................................. F16K 15/14
[52] U.S. Cl. ................................. 137/512.1; 137/855; 137/512
[58] Field of Search .................... 137/512.1, 855, 856, 137/857, 858

[56] References Cited

U.S. PATENT DOCUMENTS

| | | | |
|---|---|---|---|
| 1,632,155 | 6/1927 | Vollmann | 137/857 X |
| 2,151,746 | 3/1939 | Cody | 137/512.1 |
| 3,286,728 | 11/1966 | Stephenson | 137/856 |
| 3,412,754 | 11/1968 | Schou et al. | 137/855 X |
| 4,058,138 | 11/1977 | Viktorov et al. | 137/856 X |

FOREIGN PATENT DOCUMENTS 1237508  3/1967  Fed. Rep. of Germany ........... 137/855

*Primary Examiner*—William R. Cline
*Attorney, Agent, or Firm*—Robert E. Burns; Emmanuel J. Lobato; Bruce L. Adams

[57] ABSTRACT

A straightway valve for a positive-displacement machine comprises a polyhedral body with outlet ports and seat surfaces on the sides thereof, flat friction-free closure plates, and a means for attachment of the closure plates to the body, which takes the form of a polygon-shaped plate having on its ends clamping lugs for holding the closure plates in place on the seat surfaces of the body. The polygonal plate has, for example, a bore with projections formed around the periphery thereof and engaging a blind recess in the end face of the body, thus providing for a reliable and easily removable attachment of the plate to the valve body. The valve can serve as a suction and delivery valve in cylinders for compressors of any output with pressures of up to 1,500 kg/cm$^2$ and with shaft rotational speeds of up to 3,000 revolutions per minute.

3 Claims, 4 Drawing Figures

STRAIGHTWAY VALVE

FIELD OF THE INVENTION

The present invention relates generally to valves, and more particularly to straightway valves.

It can be most successfully used in positive-displacement machines, such as piston-type compressors.

BACKGROUND OF THE INVENTION

For the purpose of suction and delivery control, in currently used compressors, self-acting valves are employed comprising a closing member in the form of a disk or a plate, a seat, a lift stop, and a spring.

Valves represent the most critical units of a compressor. They must meet the following requirements:

have an equivalent area large enough to minimize the energy loss, be capable of immediately opening in response to a small excess pressure, provide timely closure at the end of suction and delivery strokes, ensure a hermetic seal when closed, have a low volume of dead space, and possess high strength and resistance to wear.

The higher the rotational speed of the compressor shaft, the average speed of the piston, and the gas density, the more difficult it is to provide a valve to meet all the above requirements. For example, in order to reduce the hydraulic loss, it is necessary to lower the gas velocity in the valve; this, however, can be only achieved at the expense of a larger size and a greater number of valves, which is limited by design capabilities and is incompatible with the goal of reducing the dead space volume.

On the other hand, as the compressor rotational speed is increased, with the mass of the compressor moving parts being kept constant, the spring force must necessarily rise. The spring reinforcement, however, invariably results in additional throttling of gas and in a lower output of the compressor.

For a high rotational speed of the compressor, it would be possible to increase its output and power rating by minimizing the mass of the closing member, such as disk of plate, the penalty of this being loss of strength.

Valves currently in use may be generally classified as disk valves and plate valves. Disk valves, also including ring valves, are not of the straightway type. With alternate loads on the closing member, both the closing member and the valve seat are liable to be damaged with resulting loss of sealing and overflow of the hot compressed gas, which, in turn, leads to carbon or oil scum formation and to consequent failure of the valve.

In addition, during operation, the spring-loaded closing member is rotated by vibrational forces and the spring torque, which results in a nonuniform contact of the closing member and the seat. The manufacture of such valves is most complicated, since it requires high precision finishing of the seat and closing member surfaces as to roughness and planeness. The fabrication problems are further aggravated by the fact that the main operating members of the valve are made of hard-to-machine high-tensile steel.

Nor are plate valves generally of the straightway type. They are provided with a single-path or multipath seat and a valve plate shaped as a disk, a ring or a rectangular strip. When free, they contact the seat, but, under gas pressure, they are bent along the depression arc in the lift stop means.

In such valves, the seat section is utilized nonuniformly over the length thereof, since the height of the gas flow slot formed by the bending of the plates, somewhat varies. Besides, the maximum lift of the plate is made small from the standpoint of durability, which has a prohibitive effect on the valve output. Furthermore, the gas flow turbulence at the outlet of plate valves is very high, thus increasing the temperature and, consequently, shortening the valve life.

Straightway valves are also known in the prior art. These valves differ from the other types not only in the direction of the gas flow between the parallel plates (cf. straightway valves made by Hoerbiger Ventilwerke Aktiengesellschaft, Austria), but also larger passage sections for the overall dimensions specified. The valve plates clamped at one end impede the free passage of gas to a lesser extent, thus eliminating turbulence problems and resulting in a more economical and efficient valve as well as compressor unit as a whole.

The single-ended clamping of the plate in such valves, however, leads to its vibration in the gas stream and hence to the overflow of gas in operation.

A straightway valve is known comprising a body with sides, parallel end faces, and a projection on one of the end faces, with seat surfaces formed within the body on the sides thereof, flexible closure plates formed by a longitudinally U-shaped clamp with lateral support elements carrying reed-type closing members, said closure plate being attached to the body projection by means of a cotter pin.

Such an arrangement of the valve, however, involves a comparatively large dead space volume in the body projection area, thereby decreasing the output of the valve.

Besides, the cotter pin joint considerably reduces the reliability of the valve, since the gap existing between the cotter pin and the plate and as a result of appreciable vibrations are liable to subject the cotter pin to premature fatigue and consequent fracture.

The cotter-pin attachment of the plate fails to prevent longitudinal displacement of the closure plate relative to the outlet port because of a loose fit of the cotter pin within the opening, thus entailing abrasion both of the seat surface and of the plate and resulting in a shorter life of the valve.

The cotter pin joint makes it impossible to replace the plate indefinitely, for once the cotter pin has been replaced, an increase in the opening size occurs. These shortcomings make the valve difficult to repair.

The arrangement described above fails to provide for a sufficient ease of manufacture as a result of the closure plate being U-shaped in longitudinal section and because of the cotter pin opening in the body projection.

SUMMARY OF THE INVENTION

It is an object of the present invention to provide a straightway valve with a reduced dead space.

Another object of the invention is to provide a straightway valve design such as to avoid the necessity of a cotter pin attachment of the closure plate to the valve body.

A further object of the invention is to provide a straightway valve design such as to simplify maintenance and replacement of individual parts of the valve.

Still another object of the invention is to provide a valve easier in manufacture.

Yet another object of the invention is to ensure a longer life of the valve.

With these and other objects in view in a straightway valve for a positive-displacement machine, comprising a body with sides and parallel end faces, seat surfaces and outlet ports being formed in the body on the sides thereof, flexible closure plates with U-shaped support elements carrying reedtype closing members normally contacting the seat surfaces, and a means for attachment of the closure plates to the valve body, according to the invention, there are provided grooves in the end face of the body, the closure plates being made flat and having shoulders on the U-shaped support elements, engaging said grooves, while the closure plate attachment means is disposed on the end face of the body and formed by a polygonal plate essentially congruent therewith, the plate having at the ends clamping lugs extending beyond the body sides and holding the closure plates in place on the seat surfaces of the body.

Such an arrangement makes the valve considerably easier to manufacture and simplifies its construction, owing to the plates being made flat, which eliminates the need to provide an opening for cotter pin insertion.

It is advisable that a blind recess should be formed on the end face of the body and the polygonal plate should have a central bore with projections arranged around the periphery thereof, engaging the blind recess on the end face of the body and locking said plate in place on said end face.

Such an arrangement of the polygonal plate obviates the need to employ a cotter pin joint which is unreliable in operation. In addition, provision of a blind recess rather than a projection tends to reduce the dead space volume of the valve. This valve arrangement permits release of any of the closure plates by merely removing the polygonal plates.

These and other objects and advantages of the present invention will become apparent from the following detailed description of specific embodiments thereof taken in conjunction with the accompanying drawings, in which:

DETAILED DESCRIPTION OF THE INVENTION

Figure 1:
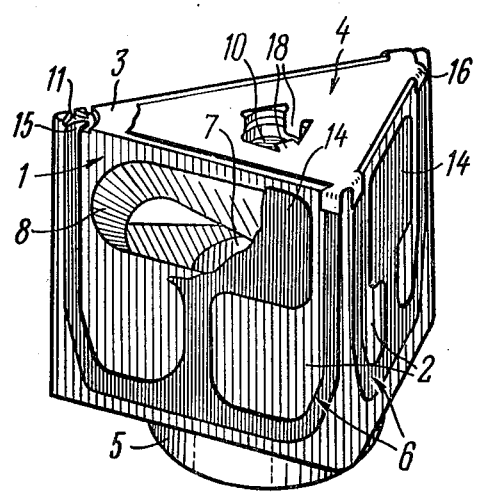
FIG. 1 is a partially cut view of a straightway valve, according to the invention.

The straightway valve comprises a body 1 (FIG. 1) having sides 2, with an attachment means in the form of a polygonal plate 4 disposed on a closed end face 3 of the body, while there is a bore (not shown) provided in the other end face, serving as an inlet to the valve and surrounded by an annular skirt 5 engaging the openings of a baseplate (not shown). Contacting the sides 2 of the body 1 are disposed closure or valve plates 6. A working cavity 7 is provided within the body of the valve. Outlet parts 8 are provided in the sides 2 of the body 1 (FIGS. 1, 2) and seat surfaces 9 peripherally of the side parts exhibiting a certain degree of surface roughness and planeness to ensure a tight fit of the closure plates 6. Disposed on the end face 3 of the body 1 are a blind recess 10 and grooves 11. Within the working cavity 7 of the body 1, there is provided a flaw splitter 12 in the form of a polyhedral pyramid with the number of its faces being equal to that of the body sides and its apex being opposed to the direction of flow of the incoming gas flow.

Figure 3:
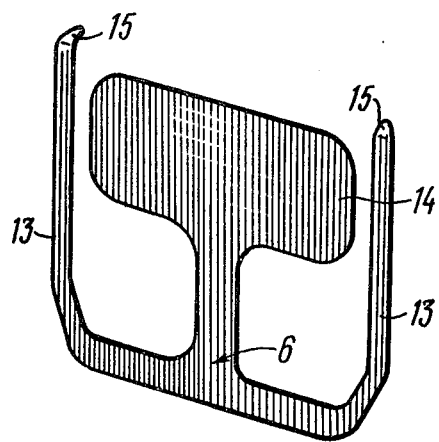
FIG. 3 shows the closure plate of the straightway valve of FIG. 1, according to the invention.

The closure plate 6 (FIG. 3) is U-shaped with support elements or arms 13 carrying a reed-type closing valve member 14, the U-shaped support elements 13 are provided with shoulders 15 on a connecting U engaging the grooves 11 of the body 1 (FIG. 1).

Figure 4:
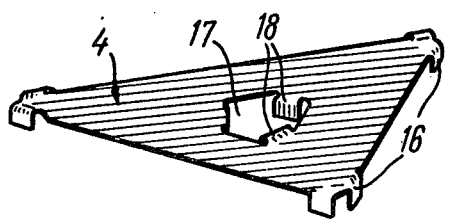
FIG. 4 shows the means for attachment of the closure plates of the straightway valve of FIG. 1, according to the invention.

The means for attachment of the closure plates 6 to the body 1 is formed by the polygonal plate 4 (FIG. 4) having at the ends clamping lugs or tabs 16 to clamp the U-shaped support elements or lugs 13 to the seat surfaces 9 of the body 1 (FIG. 1). Provided in the centre of the polygonal plate 4 is a bore 17 with projections or tabs 18 arranged around the periphery thereof and engaging the blind recess 10 on the end face 3 of the body 1 (FIG. 1).

During assembly of the valve, the closure plates 6 (FIG. 1) are placed over the sides 2 of the body 1 so that their shoulders 15 engage the grooves 11 of the body 1. The closure plate 6 then contacts the seat surface 9, the reed-type closing members 14 overlapping the outlet ports 8. The polygonal plate 4 is thrust over the end face 3 of the body 1, the projections 18 arranged around the periphery of the bore 17 in the centre of the polygonal plate 4 engaging the blind recess 10 and locking the plate with respect to the end face 3 of the body 1. The projections 18 may be bent inwardly into the blind recess 10. The polygonal plate 4 thus locked holds the U-shaped support elements 13 of the closure plate 6 in position on the seat surface 9 of the body 1. The shoulders 15 clamped between the polygonal plate 4 and the body 1 prevent the closure plate 6 from sliding over the seat surface 9, thus precluding wearing-out of the plate 6, which would result from its longitudinal displacement.

OPERATION

Figure 2:
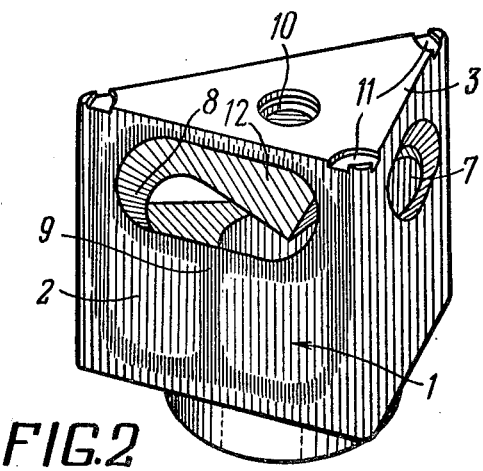
FIG. 2 shows the body of the straightway valve of FIG. 1, according to the invention.

The valve operates in the following way. Compressed air is fed to the valve through the inlet passage (not shown) enclosed within the annular skirt 5 (FIG. 1), into its working cavity 7. The compressed air flow is divided by the flow splitter or divider 12 into several streams equal in number to that of the faces of the splitter 12. These air streams reflected from the faces of the splitter 12 are driven towards the outlet ports 8 (FIGS. 1, 2), bending or flexing the closure plate 6 away from the seat surface 9. This involves not only bending off the reed-type closing member 14 (FIG. 3) secured to the U-shaped support elements 13, but also of the support elements 13 themselves, thereby relieving the reed-type closing members 14 of stress. The U-shaped support elements 13 (FIG. 1) with their shoulders 15 engaging the grooves 11 of the body 1 are held in place on the seat surfaces 9 by means of the clamping lugs 16 (FIG. 4) of the polygonal plate 4 which is attached to the body 1 (FIG. 1) by projections 18 (FIG. 4) engaging the blind recess 10 provided in the body 1 (FIG. 1 and FIG. 2).

The closure plates 6, under pressure exerted above the valve, are securely clamped to the seat surface 9, thus ensuring valve sealing and preventing air overflow.

The proposed valve can be used as a suction and delivery valve in cylinders for air or gas piston-type compressors of any output under pressures of up to 1,500 kg/cm$^2$ and with a speed of shaft rotation of up to 3,000 revolutions per minute. These valves comprising friction-free plates are designed for use in compressors without lubrication of the cylinders and glands, as well as in vacuum compressors. The valve construction makes it easy in maintenance and ensures the posibility of replacing the closing members without dismantling the valve baseplate.

The outstanding reliability of such valves, ease in maintenance and manufacture of the plates allow a 35 to 49 percent cut down in the personnel necessary for maintenance of a compressor plant.

What is claimed is:

1. A valve for a positive displacement machine such as a compressor for a gaseous fluid comprising, a valve body having a plurality of sides each with a side port and an internal cavity in communication with the side ports, said valve body having an open end with an inlet into said cavity for allowing entry of a flow of a compressible gaseous fluid into said cavity, said valve body having a closed end opposite said open end, a flow-divider internally of said valve body on said closed end extending into said cavity in a direction opposite to the direction of flow of said gas into said cavity for dividing the flow of gaseous fluid into a plurality of flows each directed to flow toward a corresponding one of said side ports, each side having a side port having a substantially planar valve seat peripherally of a corresponding side port, for each side of the body having a side port a valve plate, each valve plate comprising a reed-plate having a U-shape with two flexible mounting arms for mounting the reed-plate on said body and a connecting arm between said two mounting arms having a reed portion extending in a same direction as said mounting arms and seatable on a corresponding seat and overlying a corresponding side port, each mounting arm having an end tab for overlying said closed end of the valve body, a polygonal plate for overlying said closed end of the valve body and securing each reed-plate relative to a corresponding side of the valve body, said polygonal plate having lugs each disposed for overlying an end portion of a respective arm of a reed-plate to fix each reed-plate relative to a respective side and side port of the valve body, and means for fixing the polygonal plate on said closed end of said valve body, whereby each read-plate flexes including the mounting arms and reed portion thereof to open and close the corresponding side port under control of a respective one of said flows of gaseous fluid.

2. A valve for a positive displacement machine such as a compressor for a gaseous fluid according to claim 1, in which said closed end of said valve body has surface recesses into which a corresponding tab of a mounting arm extends.

3. A valve for a positive displacement machine such as a compressor for a gaseous fluid according to claim 1, in which said closed end has an outer surface having a recess therein and in which said polygonal plate has tabs extending into said recess for fixing said polygonal plate on said closed end.

* * * * *